(No Model.)  2 Sheets—Sheet 1.
M. F. CONNETT.
CHECK ROW LINE GUIDE FOR CORN PLANTERS.
No. 304,176. Patented Aug. 26, 1884.
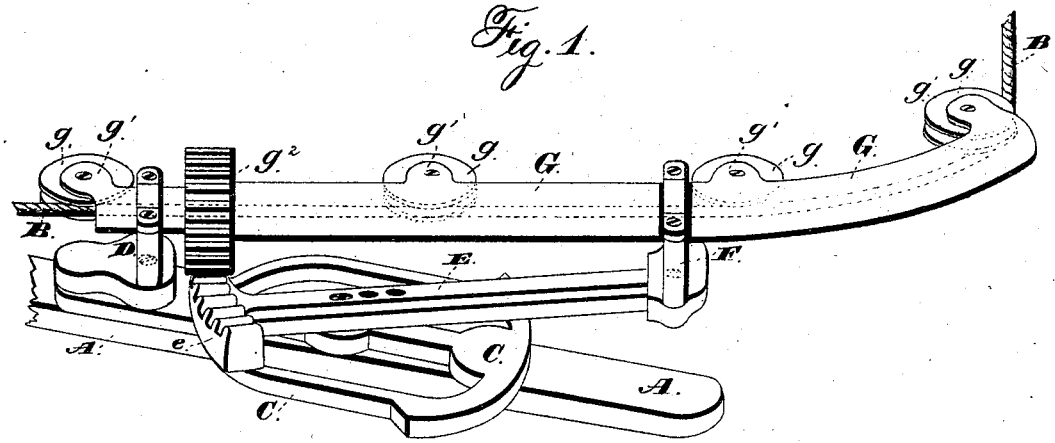

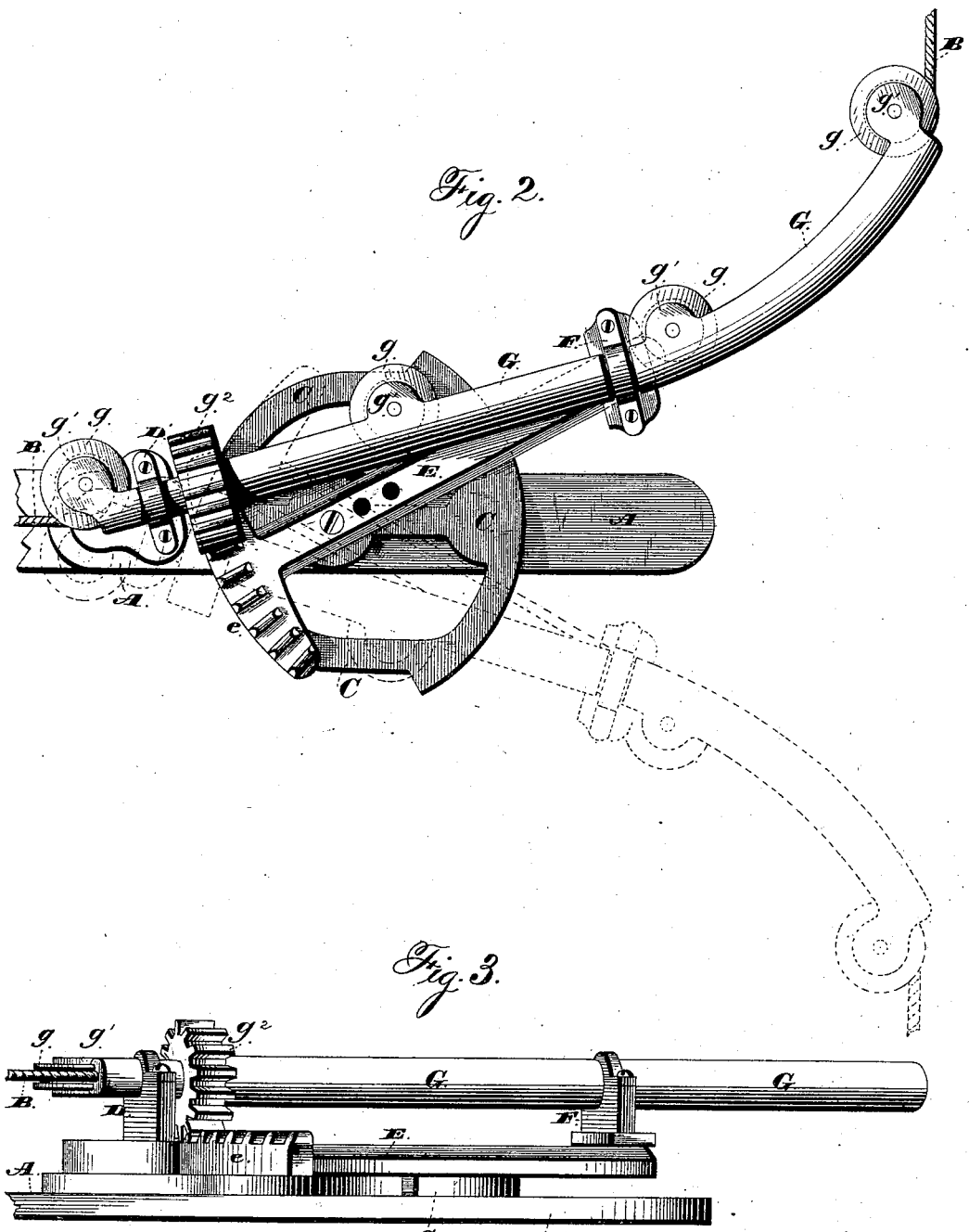

UNITED STATES PATENT OFFICE.

MATTHEW FRANKLIN CONNETT, OF SPRINGFIELD, ILLINOIS.

CHECK-ROW-LINE GUIDE FOR CORN-PLANTERS.

SPECIFICATION forming part of Letters Patent No. 304,176, dated August 26, 1884.

Application filed July 3, 1883. (No model.)

*To all whom it may concern:*

Be it known that I, MATTHEW F. CONNETT, of Springfield, in the county of Sangamon, and in the State of Illinois, have invented certain new and useful Improvements in Check-Row-Line Guides for Corn-Planters; and I do hereby declare that the following is a full, clear, and exact description thereof, reference being had to the accompanying drawings, making a part of this specification, in which—

Figure 1 is a perspective view of my check-line attachment separated from the machine. Fig. 2 is a plan view of the upper side of the same, the full lines showing one position of the check-line guide, and the dotted lines the position of said guide when arranged to permit the machine to move in an opposite direction; and Fig. 3 is a side elevation of said attachment.

Letters of like name and kind refer to like parts in each of the figures.

The design of my invention is to facilitate the taking up and payment out of the check-line in the traverse of the same over the machine in operation; and it consists in the arrangement, construction, and combination of parts forming an improved check-row-line guide, as hereinafter described, and more specifically pointed out in the claims.

In the annexed drawings, A represents one end of the main cross-bar of the check-row attachment of a corn-planter, to which bar are applied the forked levers (not shown) that are acted upon by the check-line B in its passage over the machine while the latter is in operation.

To each end of the bar A is secured a plate, C, which has, preferably, the form in plan view shown in Fig. 2, and upon its inner end supports a box or bearing, D, that is pivoted thereon and adapted to turn upon a vertical axis.

Midway between the box D and the outer end of the plate C is pivoted a bar, E, which is provided at its inner end, upon its upper face, with a segmental rack, $e$, and upon its outer end has pivoted a box, F, which corresponds to said box D, and is in like manner adapted to turn upon a vertical axis.

Journaled within the boxes D and F is a hollow bar, G, which from its inner end to or immediately beyond said box F is straight, and from the latter to its outer end has a lateral curve, as shown. Upon its inner side said bar is provided with a number of grooved pulleys, $g$, which are arranged at its ends and at equidistant points between the same, and are journaled or pivoted between ears or lugs $g'$, that project outward from said bar. As shown in the drawings, the bearing for the outer end of the guide-bar sets into a circumferential groove in the bar, so that the latter can rotate in the bearing, but not move longitudinally therein. The inner end of the bar is not so grooved, but can rotate and move longitudinally in bearing D. This it must do, because, as the bar E is pivoted at some distance from the pivotal point of bearing D, the distance between such bearing and the one on the outer end of the pivoted bar must vary as said bar is swung on its pivot. A pinion, $g^2$, secured upon the bar G, and meshing with the rack $e$ of the plate E, completes the device, the operation of which is as follows, viz: The check-line B is passed through the hollow bar G, across the machine, through the forked levers, (not shown,) and through the duplicate bar G at the opposite end of the bar A, and the ends of said check-line then secured at opposite sides of the field, in the usual manner, when, as said machine is driven forward, said line is taken up by one guide and played out through the other guide until the end of the field is reached, after which said machine is turned around, the contiguous end of said line is restaked, and the machine started in a direction opposite to that in which it before moved.

When the direction of the machine is changed, each guide-bar G is automatically reversed and placed in position for an opposite movement of the line B, such operation of said guide-bar requiring no supervision.

The mechanism described furnishes for said guide-line a support while crossing said machine that is without abrupt angles, and in which there is a minimum of friction.

Having thus fully set forth the nature and merits of my invention, what I claim as new is—

1. In combination with the curved pulley-holder, a bearing for the outer end thereof, carried on a pivoted swinging arm automatically swung toward the front or rear of the machine as said pulley-holder is turned, means for preventing the longitudinal movement of the holder in this bearing, while allowing of its rotation therein, and a pivoted bearing for the inner end of the holder, independent of the pivoted arm, and adapted to allow the holder to rotate and move longitudinally, substantially as shown and described.

2. In combination with the pivoted bar E, provided with the swiveled bearing or box F and segmental rack $e$, the pinion $g^2$, secured upon and rotating with the bar G, and meshing with said rack, and the swiveled bearing D for the inner end of the bar, substantially as and for the purpose set forth.

3. The check-row-line guide consisting of the plate C, a curved guide-bar, G, provided with guide-pulleys, a swiveled box or bearing for the inner end of the guide-bar, a pivoted swinging bar carrying at one end a swiveled box or bearing for the outer end of the guide-bar, and at the other a curved rack to engage a pinion on the inner end of the latter bar, substantially as shown and described.

4. In combination with the curved guide-bar provided with suitable line-guiding pulleys, the pivoted swinging bar carrying at its outer end a swiveled bearing for the corresponding end of the guide-bar, adapted to allow the bar to rotate but not reciprocate in it, the segmental rack on the other end of the swinging bar, the pinion on guide-bar meshing with this rack, and the bearing for the inner end of the guide-bar pivoted independently of the swinging bar, and adapted to allow of rotation and longitudinal movement of the guide-bar, substantially as and for the purpose described.

In testimony that I claim the foregoing I have hereunto set my hand this 22d day of May, A. D. 1883.

MATTHEW FRANKLIN CONNETT.

Witnesses:
  L. H. BRADLEY,
  WM. D. CARPENTER.